(12) United States Patent
Stepin et al.

(10) Patent No.: US 7,809,820 B2
(45) Date of Patent: Oct. 5, 2010

(54) OPTIMIZING ENCRYPTED WIDE AREA NETWORK TRAFFIC

(75) Inventors: Maxim Stepin, Redmond, WA (US); Dan Boldo, Bellevue, WA (US); Scott Colville, Seattle, WA (US); James Pinkerton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 11/879,253

(22) Filed: Jul. 17, 2007

(65) Prior Publication Data

US 2009/0024763 A1 Jan. 22, 2009

(51) Int. Cl.
*G06F 15/13* (2006.01)

(52) U.S. Cl. .................. 709/223; 709/201; 709/203; 709/220; 709/224; 380/28; 380/257; 380/269

(58) Field of Classification Search .......... 709/201, 709/203, 200, 223, 224; 380/28, 257, 269
See application file for complete search history.

(56) References Cited

U.S. PATENT DOCUMENTS

| | | | |
|---|---|---|---|
| 5,307,413 | A | 4/1994 | Denzer |
| 5,479,512 | A * | 12/1995 | Weiss .................. 380/28 |
| 6,122,379 | A * | 9/2000 | Barbir ................. 380/269 |
| 6,275,588 | B1 | 8/2001 | Videcrantz et al. |
| 6,704,866 | B1 | 3/2004 | Benayoun et al. |
| 6,985,589 | B2 * | 1/2006 | Morley et al. .......... 380/269 |
| 7,020,160 | B1 | 3/2006 | Achler et al. |
| 7,032,111 | B1 | 4/2006 | Ruutu et al. |
| 7,126,955 | B2 | 10/2006 | Nabhan et al. |
| 7,177,926 | B2 | 2/2007 | Kramer |
| 7,308,101 | B2 * | 12/2007 | Wing ................... 380/257 |
| 7,372,963 | B2 * | 5/2008 | Inomata et al. ........ 380/271 |
| 2003/0093563 | A1 | 5/2003 | Young et al. |
| 2004/0044761 | A1 | 3/2004 | Phillipi et al. |
| 2005/0163316 | A1 | 7/2005 | Wing |
| 2006/0294059 | A1 | 12/2006 | Chamberlain et al. |

OTHER PUBLICATIONS

"SAN Extension with Compression and Encryption in WAN Environments", Date: Mar. 2004, pp. 1-45.
Denis, et al., "Wide-Area Communication for Grids: An Integrated Solution to Connectivity, Performance and Security Problems", pp. 1-10.
Fineberg Victoria, "A Practical Architecture for Implementing End-to-End QoS in an IP Network", Date: Jan. 2002, pp. 122-130, IEEE Communications Magazine.
Smith Christopher, "IPsec's role in Network Security: Past, Present, Future", Date: Sep. 17, 2001, pp. 1-6.

* cited by examiner

*Primary Examiner*—Jinsong Hu
(74) *Attorney, Agent, or Firm*—Mayer & Williams PC (57) ABSTRACT

Optimization of encrypted traffic flowing over a WAN is provided by an arrangement in which WAN compression is distributed between endpoints (i.e., client machines or servers) in a subnet of a hub and branch network and a WAN compression server in the subnet. A client portion of the WAN compression running on each of one or more endpoints interfaces with a disposable local cache of data seen by endpoints in the subnet that is used for compressing and decompressing traffic using dictionary-based compression techniques. The local WAN compression server in a subnet stores a shared central database of all the WAN traffic in the subnet which is used to populate local disposable caches in the endpoints.

10 Claims, 6 Drawing Sheets

OPTIMIZING ENCRYPTED WIDE AREA NETWORK TRAFFIC

BACKGROUND

Information technology ("IT") management in organizations that operate branch offices must accommodate the often-conflicting needs of local-like application performance and manageability versus deployment costs. To reduce total cost of ownership ("TCO"), there is a trend where branch office servers are consolidated, and services and applications are pushed from the LAN (local area network) to being hosted across a WAN (wide area network) from a hub that is commonly located at an enterprise's headquarters location. While such branch and hub architectures can provide substantial cost benefits, the reliance on WAN resources can often lead to depleted bandwidth and increased end-user wait time. This typically results in a reduction in the quality of the user experience at a branch office compared to that at the main office, and an overall loss of productivity in the branch.

One solution to the problem has been to add more wide area bandwidth, and historically data services commonly consume a large portion of enterprise IT budgets. However, incremental increases in bandwidth can carry a disproportionate price increase and limiting factors such as network latency and application behavior can restrict both performance and the return on bandwidth investment.

WAN acceleration solutions have emerged that seek to enable the cost advantages provided by centralized servers without compromising performance by maximizing WAN utilization which can often delay or eliminate the need to purchase additional WAN bandwidth. While WAN acceleration solutions can provide significant benefits and typically represent a good return on investment, current WAN acceleration solutions are incompatible with end-to-end data integrity protocols such as IPsec (Internet Protocol Security) and SMB (Server Message Block) signing that enable secure communications between the branch clients and servers at the hub. While some current solutions are using SSL (Secure Socket Layer) encryption to provide end-to-end security, these solutions relay on deploying a private key in an intermediate device which can increase the vulnerability of a network to what are known as the "man in the middle" attacks.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Optimization of encrypted traffic flowing over a WAN is provided by an arrangement in which WAN compression is distributed between endpoints (i.e., client machines or servers) in a subnet of a hub and branch network and a WAN compression server in the subnet. A client portion of the WAN compression running on each of one or more endpoints interfaces with a disposable local cache of data seen by endpoints in the subnet that is used for compressing and decompressing traffic using dictionary-based compression techniques. The local WAN compression server in a subnet stores a shared central database of all the WAN traffic seen in the subnet which is used to populate the disposable local data caches in the endpoints.

In an illustrative example, an endpoint intercepts outbound traffic prior to being encrypted. WAN optimization is performed using dictionary-based compression that relies on dictionaries which are locally cached at the endpoints in the subnet, or by using dictionaries that are downloaded from the central database stored on the local WAN compression server. Once optimized, the traffic is passed down the TCP/IP (Transmission Control Protocol/Internet Protocol) stack and is encrypted using IPsec prior to being sent over the WAN link to the remote subnet of the hub and branch network. An endpoint at the remote subnet decrypts, and then decompresses the traffic using locally cached dictionaries, or by using dictionaries downloaded from the central WAN compression server on the remote subnet.

Advantageously, the present arrangement for optimizing encrypted WAN traffic increases WAN utilization to significantly improve the quality of the user experience at the branch subnet while maintaining end-to-end security through IPsec encryption and lowering costs. Furthermore, such performance, security, and cost reduction is achieved without using additional intermediate devices and private keys so as to avoid the man in the middle vulnerability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicates like elements in the drawings.

DETAILED DESCRIPTION

Figure 1:
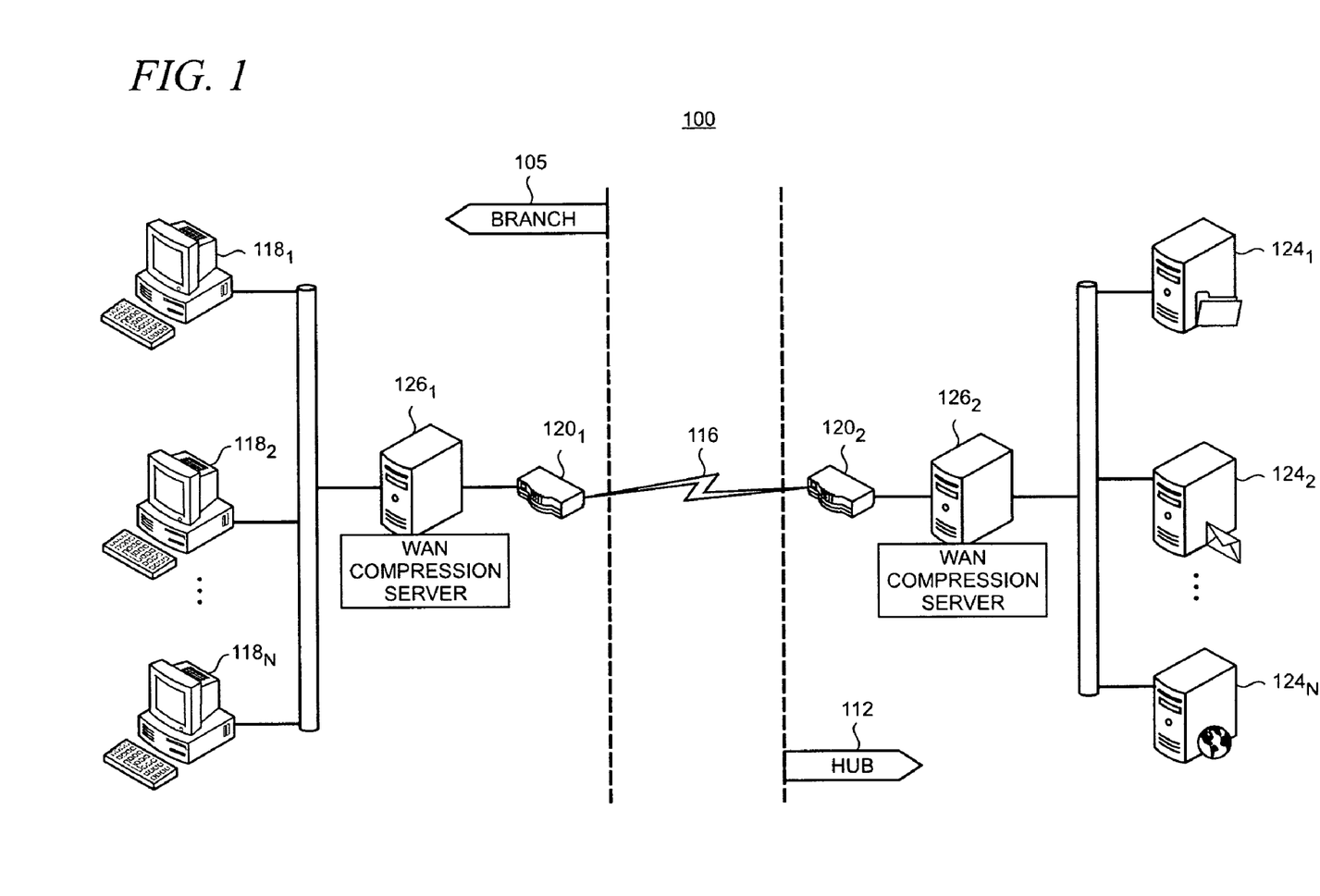
FIG. 1 shows an illustrative hub and branch network using WAN compression servers in each subnet.

FIG. 1 shows an illustrative hub and branch network 100 in which a branch 105 is coupled to a hub 112 over a WAN link 116. The term "branch" is used to describe a remote location of any-sized organization that connects to a collection of resources provided by a "hub" located, for example, as part of a main or headquarters operation. Branch 105 includes a number of client machines $118_{1, 2 \ldots N}$ that are coupled to a router $120_1$, which places traffic onto the WAN link 116 and takes traffic from the link in both directions between the branch 105 and hub 112. Client machines 118 commonly run business and productivity applications such as word processing, email, spreadsheets and the like.

A number of servers $124_{1, 2 \ldots N}$ are configured at the hub 112 to provide services to the client machines 118 in the branch 105. Such services commonly include those provided by a file server $124_1$, mail server $124_2$ and web server $124_N$. However, it is emphasized that these servers are merely illustrative and the actual number and configuration of servers may vary from that shown and will generally be dependent on the requirements of a particular branch-hub deployment. The consolidation of server infrastructure into the hub 112 typically enables all maintenance, troubleshooting, security policy enforcement, backups and auditing to be performed centrally which can significantly lower TOC for most enterprises.

WAN link 116 may operate over portions of private networks and/or public networks such as the Internet. WAN 116 is representative of many current WANs that are commonly utilized to support remote branch operations. Typical WAN issues include high network latency, constraints on bandwidth, and packet loss. Such limitations can constrain branch productivity. In addition, many business or productivity applications operating in the network 100 were developed for LAN environments and are not particularly WAN-optimized. Consequently, it is recognized that optimizing the utilization of the limited available WAN bandwidth can significantly contribute to better user experience in the branch 105. Optimizing WAN traffic provides users with the perception of a quick and responsive network and an overall experience in the branch that is more transparent, seamless, and LAN-like. In addition, many enterprises will benefit from lowered operating costs which result from a decrease in the traffic crossing the WAN link 116.

WAN compression servers $126_1$ and $126_2$ are located in respective subnets (i.e., the branch 105 and hub 112) of the network 100 in a symmetrical configuration. WAN compression servers 126 are located in the direct traffic paths at opposite ends of the WAN link 116, and are coupled to routers 120.

In this illustrative example, WAN compression servers 126 function to overcome some of the limitations in the WAN link 116 by optimizing traffic flowing over the link. Such optimization is typically implemented using various techniques, such as stateless and stateful data compression, caching, protocol specific optimizations, data pre-fetching, policy-based routing, quality of service ("QoS") techniques, and the like.

Data compression algorithms typically identify relatively short byte sequences that are repeated frequently over time. These sequences get replaced with shorter segments of code to reduce the size of the data that gets transmitted over the WAN link. Data compression can be implemented using various methodologies or algorithms including stateless compression such as the well known LZW (Lempel-Ziv-Welch) technique, and stateful compression such dictionary-based compression. Dictionary compression relies on storing all the data passing a compression engine in an external dictionary. In addition to storing the data, the compression engine identifies the data already seen and replaces it with a much smaller reference to an index in the dictionary, thereby enabling subsequent decompression of the data.

Caching entails the WAN compression server 126 simulating an application server by watching all requests and saving copies of the responses. If another request is made from a client machine 118 for the same file, the WAN compression server 126 functions as a proxy and, after validating with the server that the file has not been altered, may serve the file from its cache.

Policy-based routing is commonly used to implement quality of service techniques that classify and prioritize traffic by application, by user, or in accordance with characteristics of the traffic (e.g., source and/or destination addresses). In combination with queuing, policy-based routing can allocate available WAN bandwidth to ensure that traffic associated with some applications does not disrupt enterprise-critical traffic. Prioritization may be implemented, for example, using policy-based QoS to mark outbound traffic with a specific Differentiated Services Code Point ("DSCP") value. DSCP-capable routers read the DSCP value and place traffic being forwarded into a specific queue (e.g., a high-priority queue, best effort, lower than best effort, etc.) that are serviced based on priority.

The particular techniques utilized can vary by deployment, but most types of compression servers commonly utilize data compression in one form or another. Data that is encrypted, however, is generally perceived as random data by compression algorithms, which makes it virtually impossible to compress.

As encrypted traffic is not suited for compression, the hub and branch arrangement shown in FIG. 1 could be arranged to do without acceleration of encrypted traffic which will typically result in a significant performance penalty. Alternatively, traffic could be accelerated but then not encrypted which can present a significant security vulnerability.

Another alternative is to utilize intermediate devices or servers at both the branch and hub which terminate SSL (Secure Socket Layer) traffic and then decrypt, store segments of the data for future reference, and re-encrypt it. Later traffic through the devices is compared with these segments. When data being sent matches a segment, the devices send a compact reference rather than the longer complete segment, thereby reducing the amount of traffic that has to cross the WAN link. In some cases, devices use the private key of the server to decrypt the session key that is used over the WAN link.

While use of SSL can provide desirable end-to-end security for traffic between the branch and hub, the intermediate devices suffer from several drawbacks. The stored segments are typically stored in unencrypted form which can present some security vulnerability. In addition, by putting the private key on the intermediate device, there is increased risk that security holes may be opened and accessed through the device in a man in the middle attack.

Figure 2:
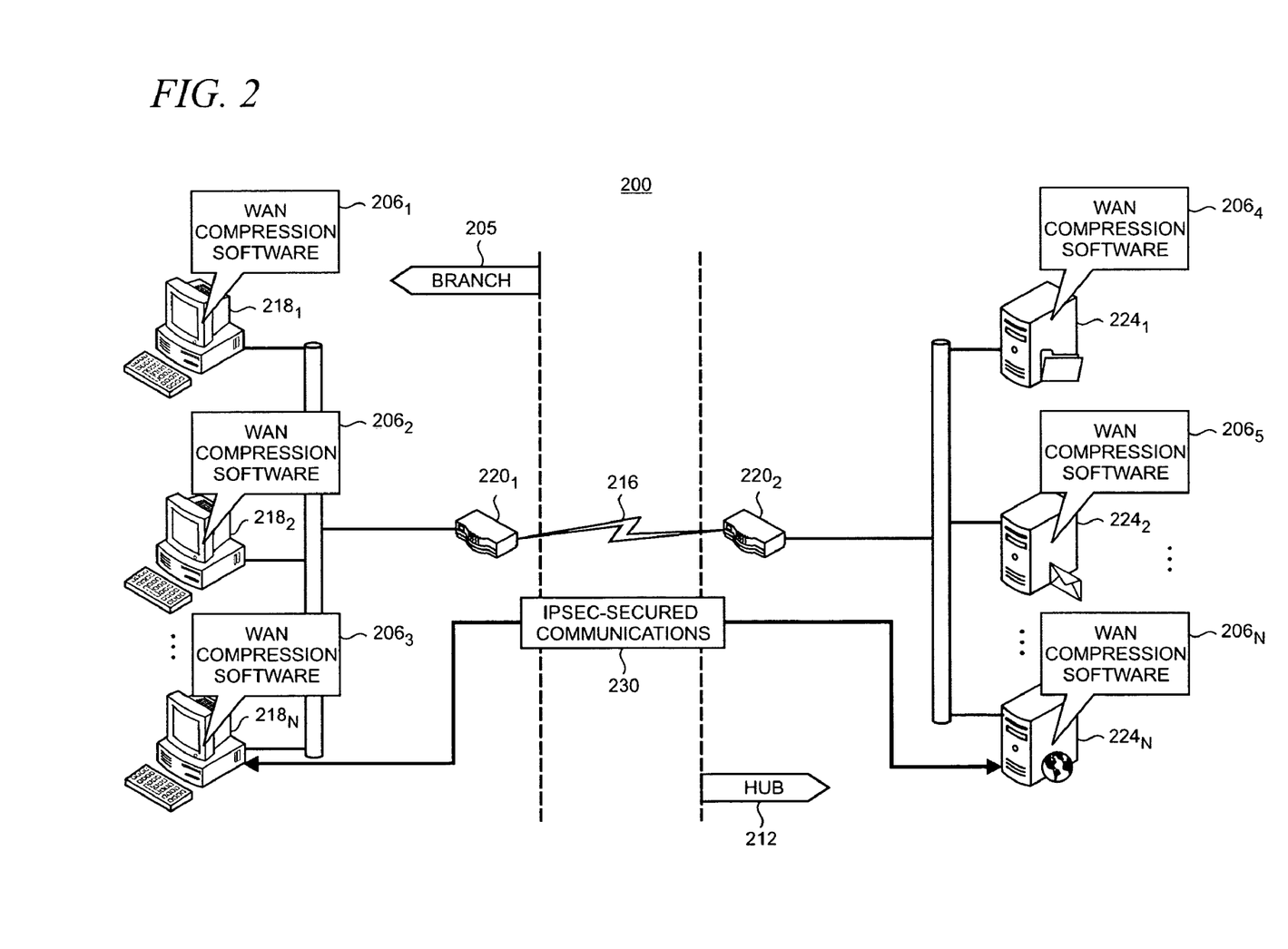
FIG. 2 shows an illustrative hub and branch network in which WAN compression is implemented using software that is located at each endpoint in the network.

FIG. 2 shows an illustrative hub and branch network 200 in which WAN compression is implemented using software $206_{1, 2 \ldots N}$ that is located at each of the client machines 218 and servers 224 (termed "endpoints") in the network. In this illustrative arrangement, the WAN compression servers are removed from the traffic paths over WAN link 216. Instead, traffic at each endpoint is compressed before being handed off to a TCP/IP stack, encrypted (e.g., using IPsec), and placed onto the WAN link 216 by routers 220. At the receiving endpoint, the traffic is decrypted, decompressed and delivered to the appropriate process or application. Therefore, IPsec-secured traffic traverses the WAN link 216 between endpoints as indicated by reference numeral 230 (while secure traffic is illustratively shown between endpoints $218_N$ and $224_N$, it is noted that such traffic may typically flow between any endpoint in the branch 205 and any endpoint in the hub 212).

While moving WAN compression to the endpoints provides end-to-end security for traffic, one of the principal advantages provided by the WAN compression servers shown in FIG. 1 is lost. Specifically, data reduction and caching is unable to be performed on a subnet-basis and instead is limited to traffic that is seen at a particular endpoint. In addition, the size of the cached data, even when scoped to a single machine may present a substantial impact to the available resources particularly as the client machines 218 may be limited in terms of processor power, memory, and storage.

The limitations of the WAN compression servers and WAN compression performed at the endpoints shown respectively in FIGS. 1 and 2 and described in the accompanying text are overcome by the present arrangement for optimizing encrypted WAN traffic shown in FIGS. 3-8 and described in the accompanying text.

Figure 3:
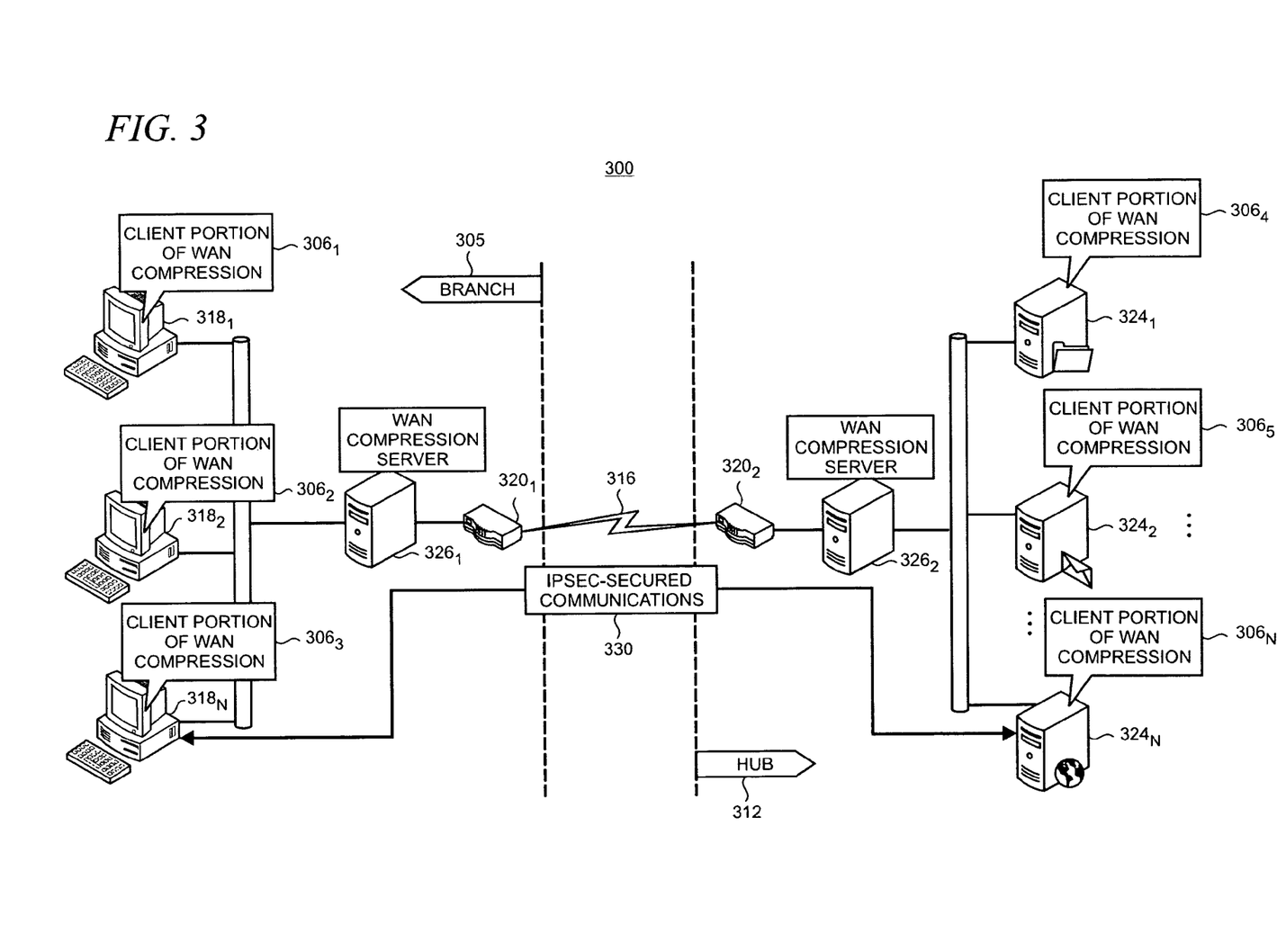
FIG. 3 shows an illustrative hub and branch network in which WAN compression is implemented using a distributed architecture.
Figure 4:
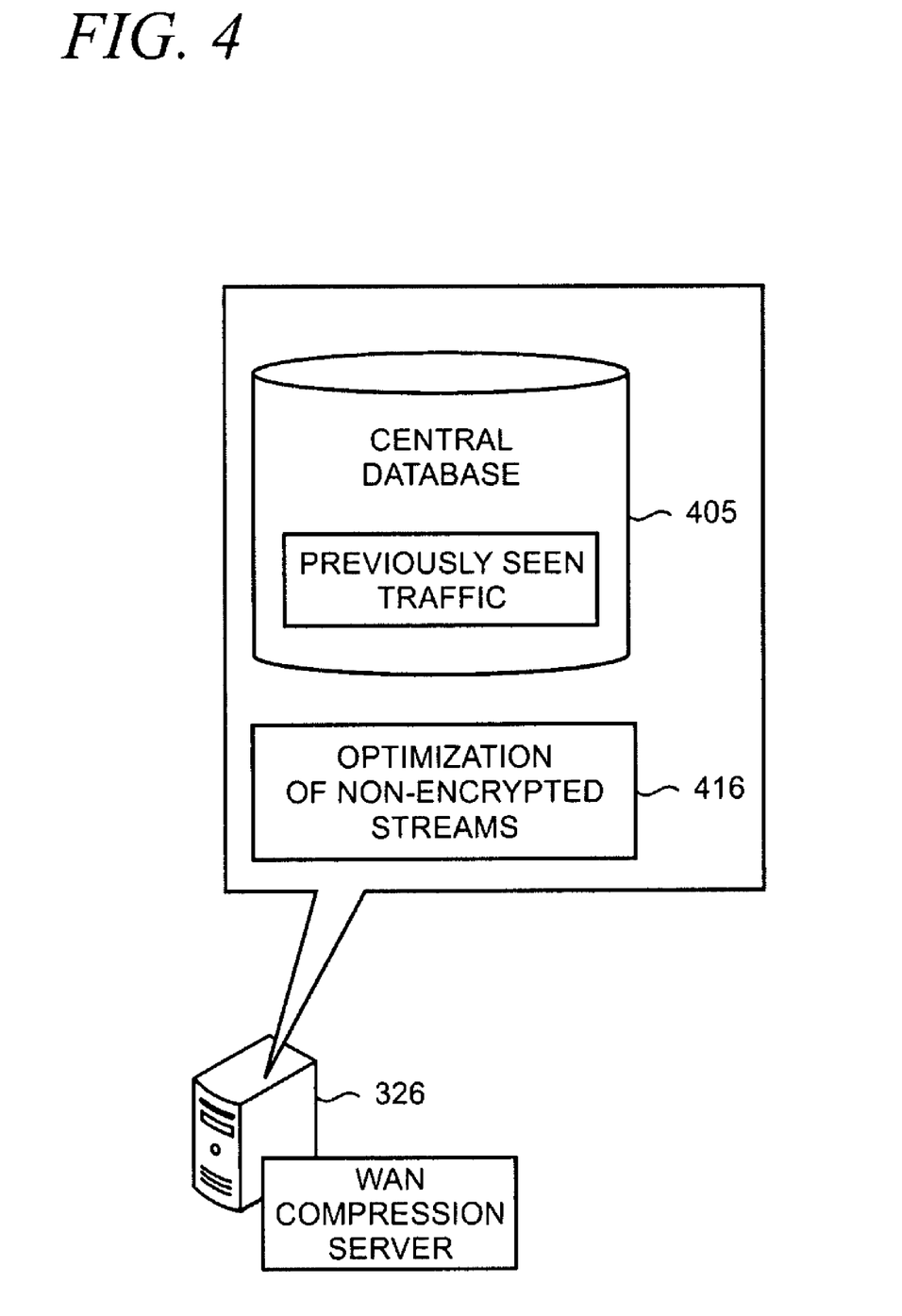
FIG. 4 shows a set of illustrative components that are implemented in a WAN compression server.

FIG. 3 shows an illustrative hub and branch network 300 in which WAN compression is implemented using a distributed architecture. WAN compression servers $326_1$ and $326_2$ are respectively used in the branch 305 and hub 312. As shown in FIG. 4, each WAN compression server 326 is arranged to store a shared central database 405 of previously seen traffic in the subnet as dictionaries that are indexed to support dictionary-based compression. It is emphasized that while dictionary-based compression is used in this example, the present arrangement for optimizing encrypted WAN traffic is not limited to dictionary-based compression, and other compression techniques may be used as may be required to meet the needs of a particular implementation. The WAN compression servers 326 are also arranged to perform conventional WAN optimization, as indicated by reference numeral 416, for non-encrypted traffic traversing the WAN link 316 via routers $320_1$ and $320_2$ (FIG. 3).

Returning again to FIG. 3, a client portion (as indicated by reference numeral $306_{1, 2 \ldots N}$) of the WAN compression is also included on one or more of the endpoints (i.e., client machines $318_{1, 2 \ldots N}$ and servers $324_{1, 2 \ldots N}$) in the network 300 so that traffic is intercepted and compressed prior to being encrypted and sent over the WAN link 316. In this illustrative example, the traffic is encrypted using IPsec as indicated by reference numeral 330.

Figure 5:
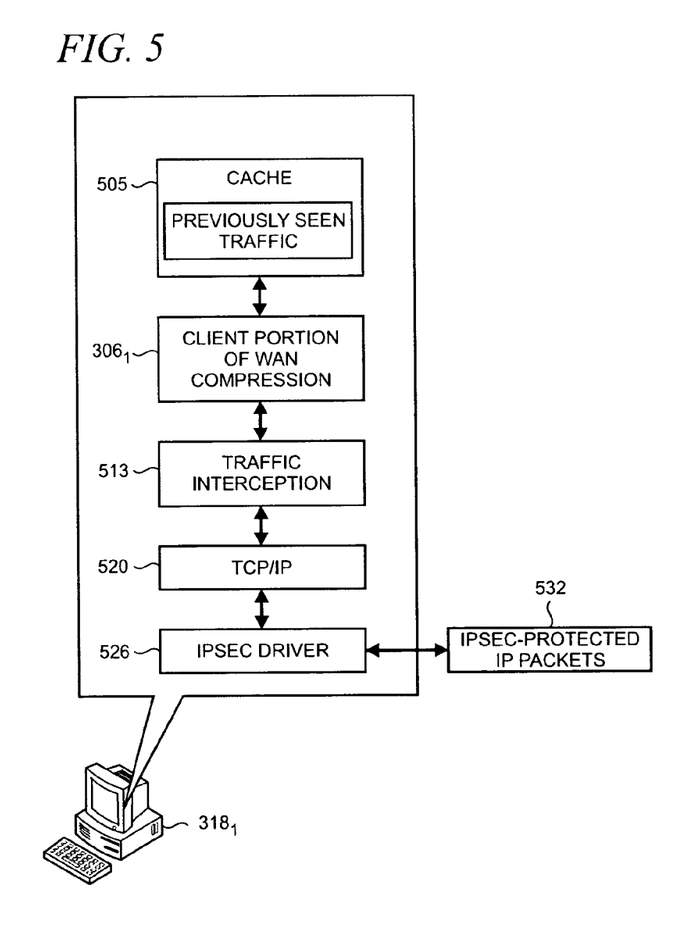
FIG. 5 shows a set of illustrative components that are implemented at an endpoint in the hub and branch network.

FIG. 5 shows a set of illustrative components that are implemented at an endpoint in the network. The endpoint shown in FIG. 5 is a client machine 318, however it is emphasized that similar components are typically implemented in a symmetric manner at endpoints in the opposite subnets of the network 300. The client portion 316, interfaces with a database cache 505 and a traffic interception functionality 513, as shown.

Traffic seen by the endpoint is stored in a disposable local cache 505 in accordance with a caching policy that is formulated to limit the possibility that the client machine's resources will not be overused. Cache 505 is used by an endpoint when performing dictionary-based compression and decompression, and may be supplemented or updated with dictionaries from the central database 405 (FIG. 4) when necessary, as described below.

The traffic interception functionality 513 is utilized to intercept traffic traversing the WAN link 316 to and from the hub 312 so that the client portion $306_1$ can compress outbound traffic and decompress inbound traffic to the endpoint. Traffic interception functionality 513 is accordingly arranged to interface with the TCP/IP stack 520 on the endpoint. TCP/IP stack 520, in turn, interfaces with an IPsec driver 526 that sends and receives IPsec-protected IP packets 532 over the WAN link 316 via the routers 320.

Figure 6:
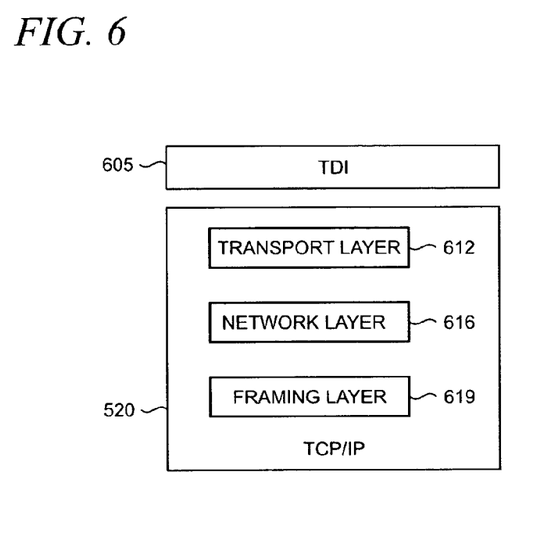
FIG. 6 shows a first illustrative architecture used for intercepting traffic at an endpoint.

The traffic interception functionality 513 may be implemented differently depending upon the operating system ("OS") that is utilized by a particular endpoint. For example, as shown in FIG. 6, for endpoints using Microsoft® Windows XP® and Windows Server® 2003 on the respective client machines 318 and servers 324 utilize a Transport Driver Interface 605 ("TDI") which is a common interface used to communicate with the network transport protocols in the TCP/IP stack 520. TCP/IP stack 520 includes a Transport Layer 612 that contains implementations of TCP and UDP (User Datagram Protocol) and a mechanism to send raw IP packets that do not need a TCP or UDP header. TCP/IP stack 520 also includes a Network Layer 616 that contains implementations of Internet Protocols, such as IPv4 or IPv6. A Framing Layer 619 contains modules that frame IPv4 or IPv6 packets.

Figure 7:
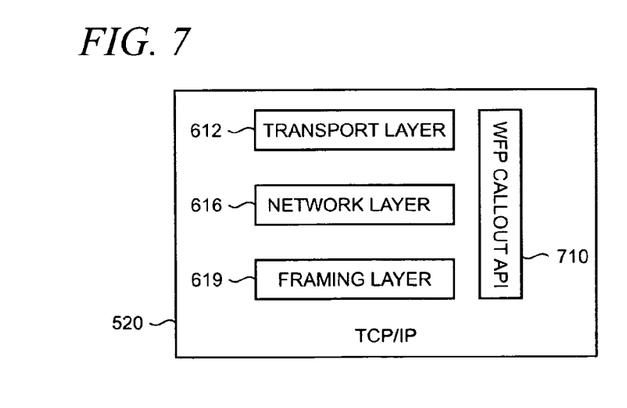
FIG. 7 shows a second illustrative architecture used for intercepting traffic at an endpoint.

FIG. 7 shows an alternative illustrative implementation of the traffic interception functionality that is utilized, for example by endpoints using Microsoft Windows Vista™ or Microsoft Windows Server® 2008 (formerly known by its codename "Longhorn") OSs. Here, the TCP/IP stack 520 is arranged to expose a Windows Filtering Platform ("WFP") Callout API 710 (application programming interface) that enables the client portion 306 of the WAN compression to access packet processing paths at both the Transport Layer 612 and Network Layer 616. It is noted, however, that TDI is also supported by Windows Vista and Windows Server 2008 to maintain backwards compatibility for TDI-based clients and processes.

Figure 8:
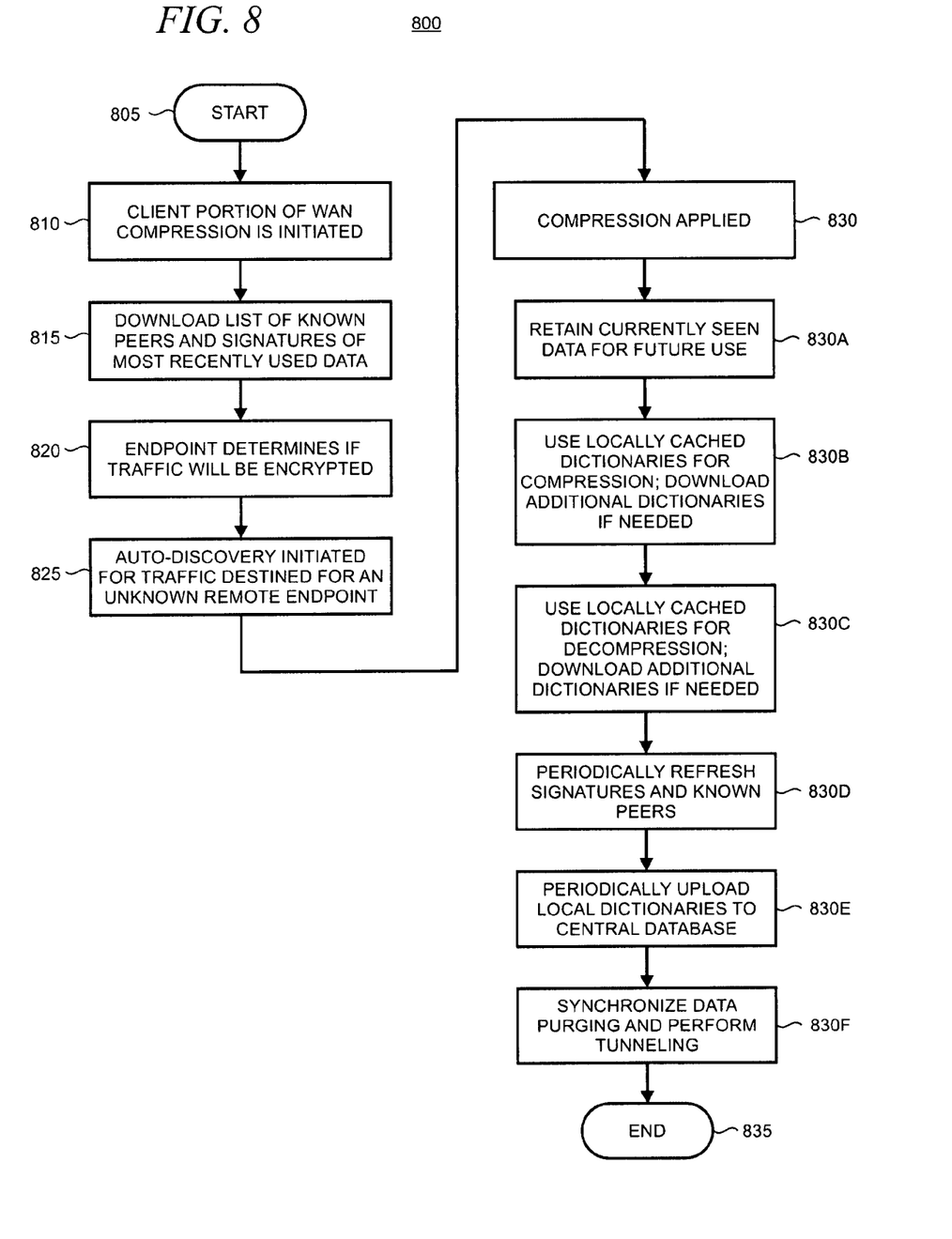
FIG. 8 is a flowchart of an illustrative method for implementing WAN compression in a hub and branch network.

FIG. 8 is a flowchart of an illustrative method 800 for implementing the present distributed WAN compression in the hub and branch network 300 shown in FIG. 3. The method starts at block 805. At block 810, the client portion 306 of the WAN compression on an endpoint (i.e., either a client machine 318 or server 324) is initiated. The client portion 306 performs discovery of the local WAN compression server 326 in the subnet (i.e., either the branch 305 or hub 312) by either broadcasting within the subnet, or by having the name of the WAN compression server pre-configured in the endpoint.

At block 815, once a connection is successfully established with the local WAN compression server 326, the endpoint downloads a list of known peers (i.e., other endpoints in the network that are also running an instance of the client portion 306 of the WAN compression). The endpoint also downloads signatures of the most recently seen data at each peer.

The endpoint then determines if traffic originating from the endpoint is going to be encrypted at block 820. In this illustrative example, IPsec is utilized. Thus, the determination may be accomplished by checking the IPsec policy. Alternatively, the network data may be examined and analyzed. In both cases, the goal of the determination step is to identify one or more encrypted streams that are going from the local subnet over the WAN link 316.

At block 825, if a stream is destined for an unknown remote endpoint, an auto-discovery routine is initiated, for example, using a reserved TCP/UDP port, or through use of other methods for facilitating endpoint discovery. If the remote endpoint is discovered to include a client portion 306 of the WAN compression, then the address of the remote endpoint is reported back to the local WAN compression server 326. In a symmetrical manner, the address of the endpoint initiating the auto-discovery routine is reported to the remote WAN compression server 326.

At block 830, compression is applied to the traffic using one of various alternative techniques. Such techniques include, for example, LZW compression applied to a packet or group of packets, or dictionary-based compression. Compression may further be applied to packets across the same TCP stream using, for example, a conventional proxy approach or using a collective operation such as gather/scatter.

As indicated in blocks 830A-F, the compression step includes substeps which take a number of considerations into account. At block 830A, the endpoint is configured to remember data that is currently seen by it and other peers in the subnet. The data is cached locally in the traffic database cache 505 (FIG. 5) and periodically uploaded to the central traffic database (e.g., database 405 in FIG. 4) at the local WAN compression server 326, along with signatures described in the text accompanying block 815.

At block 830B, existing locally cached dictionaries (e.g., those in cache 505 in FIG. 5 at each of the endpoint peers) are used to compress traffic being sent from the endpoint. Current signatures downloaded from the local WAN compression server 326 in the subnet are used to determine the best set of dictionaries to perform the compression. Dictionaries that are cached locally will be immediately used to perform compression. If there are insufficient locally cached dictionaries in the subnet, then the endpoint can download an appropriate portion of the central dictionary (e.g., from the central database 405 in FIG. 4). Each endpoint may further be configured to dispose of those dictionaries from its cache, for example, that are not used for a period of time equaling some predetermined threshold or using some other disposal criteria or methodologies.

At block 830C, the existing cached dictionaries in the endpoint peers in the subnet are used to decompress traffic received from remote endpoints. Dictionaries which are used by a remote endpoint to compress traffic which are not available in the local caches 505 (FIG. 5) in the receiving endpoint are downloaded from the WAN compression server 326. These downloaded dictionaries are cached in the endpoint dictionary caches 505 for possible future use. The endpoint performing the compression may be further configured to provide hints to the endpoint performing the decompression to enable that endpoint to pre-fetch the appropriate dictionaries that will be needed to perform the decompression.

At block 830D, the one or more of the endpoint in the subnet will periodically refresh the current list of signatures and known peers from the local WAN compression server 326. This is typically accomplished by downloading changes in the form of deltas between the stored signature and peer list and the refreshed list. At block 830E, one or more of the endpoints will periodically upload their dictionaries from the local cache 505 (FIG. 5) to the central database 405 (FIG. 4) in the local WAN compression server 326.

At block 830F, the WAN compression servers 326 in each subnet communicate with each other over the WAN link 316 to synchronize the purging of data from their respective central traffic databases as it becomes obsolete. In addition, as noted above, the WAN compression servers 326 may perform WAN compression and optimization of non-encrypted traffic using, for example, conventional IP tunneling techniques. The illustrative method 800 ends at block 835.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a network endpoint in a subnet of a branch and hub network, for optimizing traffic over a WAN link, the method comprising the steps of:
   intercepting, prior to being encrypted, outbound traffic that is destined to be encrypted as a secure stream;
   retaining the intercepted traffic in a local cache in the endpoint;
   uploading a signature for the retained traffic to the central server;
   compressing the intercepted traffic using dictionaries cached at the network endpoint, the dictionaries including at least traffic data that is representative of traffic previously observed in the subnet; and
   communicating with a central server located on the subnet to receive updates for the dictionaries.

2. The method of claim 1 in which the central server is a WAN compression server and the endpoint is a client computer in a branch subnet of a branch and hub network, or is a server in a hub subnet of a branch and hub network.

3. The method of claim 1 in which the compressing is performed using one of stateless compression or stateful compression.

4. The method of claim 1 including a further step of encrypting the compressed traffic prior to the traffic being transported over the WAN link.

5. The method of claim 4 in which the encrypting is performed using IPsec.

6. The method of claim 1 in which the intercepting is performed through a TCP/IP stack.

7. The method of claim 1 in which the updates include updating local dictionaries or signatures stored at the central server.

8. The method of claim 1 in which the traffic previously observed in the subnet is observed by a peer to the endpoint, or by the central server.

9. A method, performed by a network endpoint in a subnet of a branch and hub network, for optimizing traffic over a WAN link, the method comprising the steps of:
   intercepting, prior to being encrypted, outbound traffic that is destined to be encrypted as a secure stream;
   compressing the intercepted traffic using dictionaries cached at the network endpoint, the dictionaries including at least traffic data that is representative of traffic previously observed in the subnet; and
   communicating with a central server located on the subnet to receive updates for the dictionaries,
   wherein the updates include signatures indicative of traffic observed by one or more peers to the endpoint in the subnet.

10. A method, performed by a network endpoint in a subnet of a branch and hub network, for optimizing traffic over a WAN link, the method comprising the steps of:
    intercepting, prior to being encrypted, outbound traffic that is destined to be encrypted as a secure stream;
    compressing the intercepted traffic using dictionaries cached at the network endpoint, the dictionaries including at least traffic data that is representative of traffic previously observed in the subnet;
    communicating with a central server located on the subnet to receive updates for the dictionaries; and
    decompressing inbound traffic using data cached at the network endpoint, the data including at least traffic data that is representative of traffic previously observed in the subnet,
    wherein a remote endpoint in the remote subnet sends a hint to the network endpoint, the hint arranged to indicate dictionary data to be pre-fetched, the dictionary data usable for decompressing the inbound traffic.

* * * * *